United States Patent
Ökvist et al.

(10) Patent No.: US 12,476,731 B2
(45) Date of Patent: Nov. 18, 2025

(54) METHOD AND APPARATUS FOR LINK ADAPTATION IN A WIRELESS COMMUNICATION NETWORK VIA TDD CONFIGURATION CONTROL

(71) Applicant: Telefonaktiebolaget LM Ericsson (publ), Stockholm (SE)

(72) Inventors: Peter Ökvist, Luleå (SE); Kjell Larsson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 409 days.

(21) Appl. No.: 17/800,587

(22) PCT Filed: Feb. 21, 2020

(86) PCT No.: PCT/SE2020/050203
§ 371 (c)(1),
(2) Date: Aug. 18, 2022

(87) PCT Pub. No.: WO2021/167506
PCT Pub. Date: Aug. 26, 2021

(65) Prior Publication Data
US 2024/0007205 A1 Jan. 4, 2024

(51) Int. Cl.
*H04L 1/00* (2006.01)
*H04B 17/318* (2015.01)
*H04L 5/14* (2006.01)

(52) U.S. Cl.
CPC .......... *H04L 1/0026* (2013.01); *H04L 1/0006* (2013.01); *H04L 5/1469* (2013.01); *H04B 17/328* (2023.05)

(58) Field of Classification Search
CPC ....... H04B 17/328; H04L 5/1469; H04L 5/22; H04L 72/0446
See application file for complete search history.

(56) References Cited

U.S. PATENT DOCUMENTS

2004/0063453 A1 4/2004 Koo et al.
2013/0286904 A1 10/2013 Xu et al.
(Continued)

FOREIGN PATENT DOCUMENTS

WO 2015066663 A1 5/2015
WO WO-2020032842 A1 * 2/2020 ........... H04B 7/0626

OTHER PUBLICATIONS

3GPP TS 38.300 version 15.8.0 Release 15, Jan. 2020, titled 5G; NR; Overall description; Stage-2 (Year: 2020).*

(Continued)

*Primary Examiner* — Ayaz R Sheikh
*Assistant Examiner* — Christopher R Davis
(74) *Attorney, Agent, or Firm* — Murphy, Bilak & Homiller, PLLC

(57) ABSTRACT

A Transmission Reception Point (TRP 22) of a wireless communication network (10) operates with a Time Division Duplexing (TDD) configuration for downlink and uplink communications, and a network node (18) detects a trigger condition for adapting the TDD configuration, with the trigger condition at least including detection of an impairment condition arising from periodic fading on one or more of the radio links between the TRP and User Equipments (UEs 12). For example, the network node (18) determines that the impairment condition exists and satisfies one or more additional criteria, and, in response, adapts the TDD configuration of the TRP, to improve the responsiveness of Link Adaptation (LA) by the TRP (22). An advantageous recognition underlying responsive adaptation of the TDD configuration is that the TDD configuration of the TRP (22) influences the LA time constant or convergence time of the LA algorithm used by the TRP (22).

14 Claims, 8 Drawing Sheets

MONITOR FOR EXISTENCE OF IMPAIRMENT CONDITION ARISING FROM PERIODICITY OF PERIODIC FADING BEING SHORTER THAN A LINK ADAPTATION (LA) TIME CONSTANT OF A TRANSMISSION-RECEPTION-POINT (TRP)
1002

RESPONSIVE TO TRIGGER CONDITION BEING FULFILLED, ADAPT THE TIME-DIVISION-DUPLEX (TDD) CONFIGURATION OF THE TRP SO AS TO REDUCE THE LA TIME CONSTANT, THE TRIGGER CONDITION COMPRISING AT LEAST DETECTING THE EXISTENCE OF THE IMPAIRMENT CONDITION
1004

(56) References Cited

U.S. PATENT DOCUMENTS

2013/0315153 A1 11/2013 Sebeni et al.
2016/0249329 A1 8/2016 Au et al.
2016/0255608 A1 9/2016 Park

OTHER PUBLICATIONS

3GPP TS 38.211 version 15.8.0 Release 15, Jan. 2020, titled 5G; NR; Overall description; Stage-2 (Year: 2020).*
3GPP TS 38.212 version 15.8.0 Release 15, Jan. 2020, titled 5G; NR; Multiplexing and channel coding (Year: 2020).*
3GPP TS 38.213 version 15.8.0 Release 15, Jan. 2020, titled 5G; NR; Overall description; Stage-2 (Year: 2020).*
3GPP, "3rd Generation Partnership Project; Technical Specification Group Radio Access Network; NR; Physical layer procedures for control (Release 15)", 3GPP TS 38.213 V15.3.0, Sep. 2018, 101 pages.

* cited by examiner

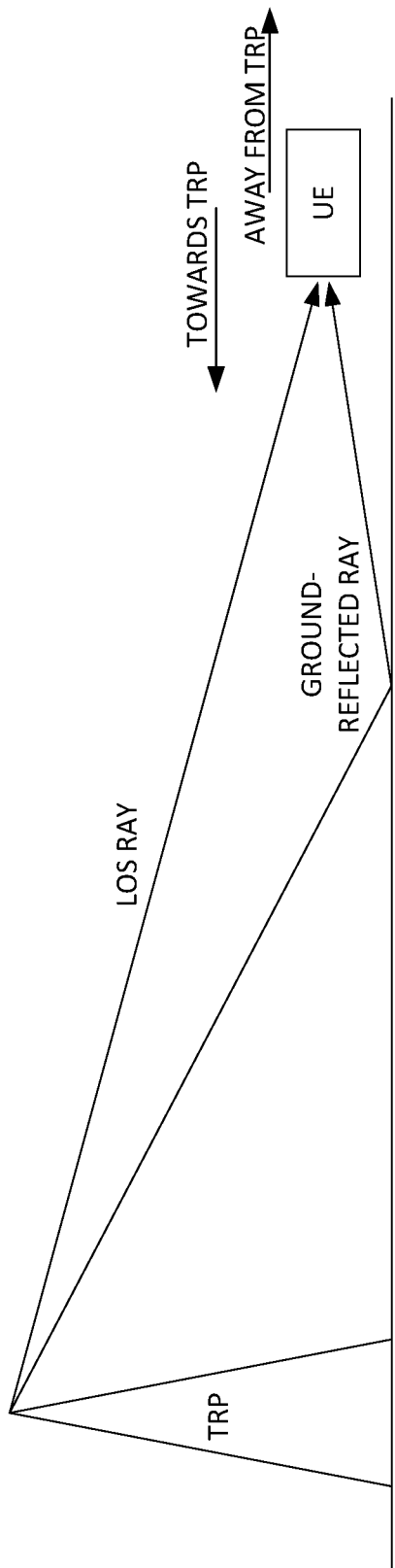

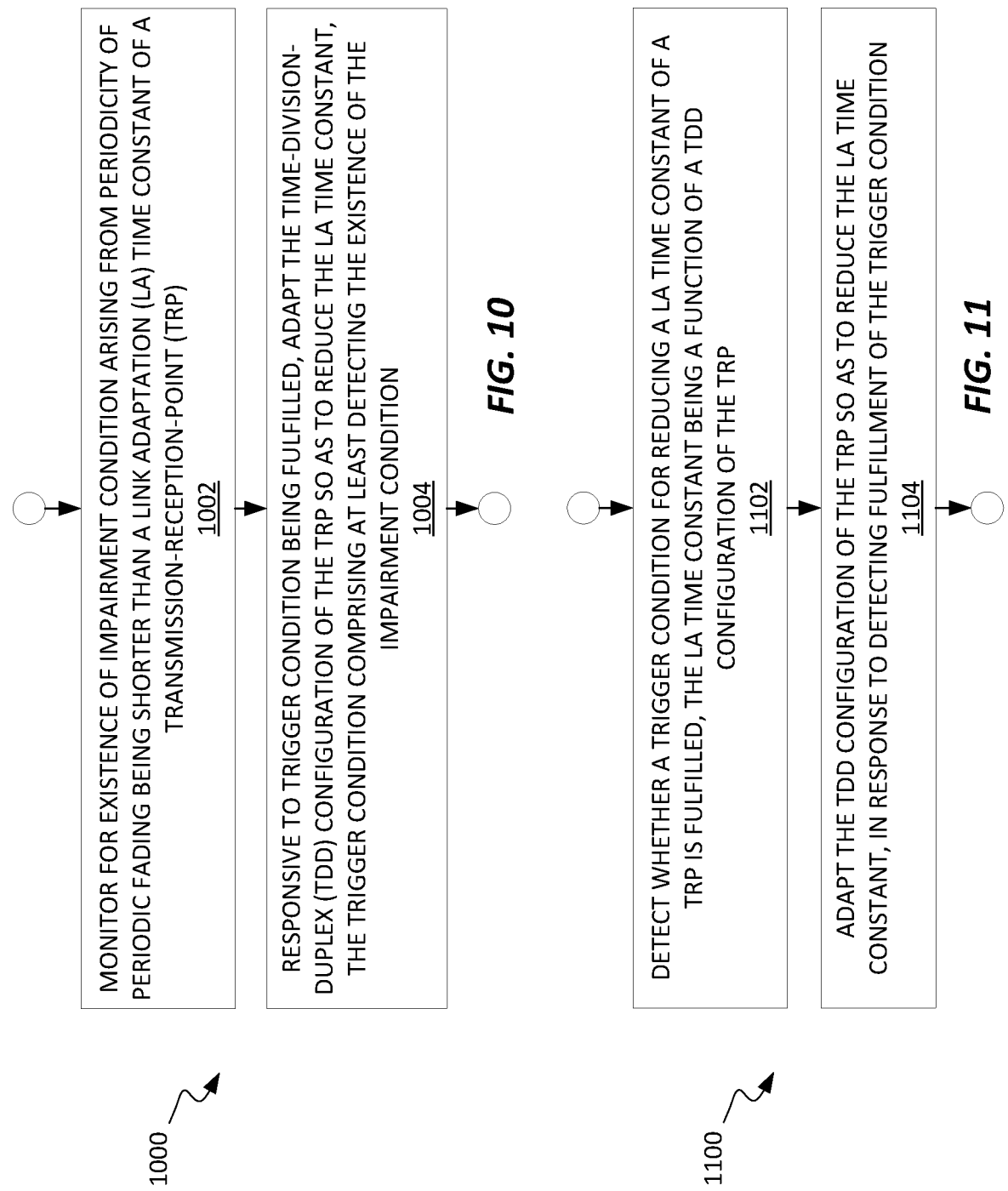

METHOD AND APPARATUS FOR LINK ADAPTATION IN A WIRELESS COMMUNICATION NETWORK VIA TDD CONFIGURATION CONTROL

BACKGROUND

"Link adaptation or "LA" refers to the practice of changing one or more transmission parameters used for transmitting a communication signal, to account for changing radio conditions. Manipulating the modulation and coding scheme (MCS) responsive to measured changes in the radio link represents one example of link adaptation. Lower modulation orders are more robust but convey fewer bits per modulation symbols, and higher coding rates are more robust but decrease the throughput of new information. Additionally, or alternatively, link adaptation involves dynamic adjustment of transport block sizes or transmission power.

Taking an example case of a wireless communication network in which a base station transmits data to a User Equipment (UE), the base station adapts the downlink toward the UE in response to Channel Quality Indicator (CQI) feedback, or, more broadly, Channel State Information (CSI) feedback from the UE, such as feedback indicating Reference Signal Received Power (RSRP) at the UE, for a reference signal transmitted by the base station. Consistent with the above examples, a non-limiting approach involves the base station adapting the MCS used for transmitting data to the UE, responsive to changes in the CQI or CSI feedback from the UE.

As a specific example of a LA algorithm, a so-called "jump" algorithm backs off from a control target more quickly than it returns. When performing LA on a radio link between a TRP and a UE, the jump algorithm decreases a target level by a downward step in response to a negative acknowledgment (NACK) of a Hybrid Automatic Repeat reQuest (HARD) transmission over the involved radio link and increases the target level by an upward step in response to a positive acknowledgement (ACK). However, the upward step size is a fraction of the downward step size, meaning that the target level operated on by the jump algorithm climbs back towards its pre-NACK level more slowly than it fell. The climbing rate may be, for example, $1/10$th or $1/100$th of the fall-back rate. Consequently, while jump algorithms respond well to sudden decreases in channel quality, the long "time constant" associated with climbing back to a more aggressive target level in response to improved channel conditions makes it difficult for the jump algorithm to handle certain scenarios.

SUMMARY

A Transmission Reception Point (TRP) of a wireless communication network operates with a Time Division Duplexing (TDD) configuration for downlink and uplink communications, and a network node detects a trigger condition for adapting the TDD configuration, with the trigger condition at least including detection of an impairment condition arising from periodic fading on one or more of the radio links between the TRP and User Equipments (UEs). As an example, the network node determines that the impairment condition exists and satisfies one or more additional criteria, such as the number of UEs affected, the criticality or type of services affected, a reduction in throughput(s), etc., and, in response, adapts the TDD configuration of the TRP, to improve the responsiveness of Link Adaptation (LA) by the TRP. An advantageous recognition underlying responsive adaptation of the TDD configuration is that the TDD configuration of the TRP influences the LA time constant or convergence time of the LA algorithm used by the TRP.

In an example embodiment, a method of operation by a network node of a wireless communication network includes the network node monitoring for the existence of an impairment condition for uplink or downlink communications handled by a TRP of the wireless communication network. The impairment condition arises from a periodicity of periodic fading affecting the uplink or downlink communications being shorter than a Link Adaptation (LA) time constant for the TRP performing link adaptations with respect to the uplink or downlink communications. The LA time constant depends upon a TDD configuration of the TRP, and the method further includes the network node, in response to a trigger condition being fulfilled, adapting the TDD configuration of the TRP so as to reduce the LA time constant. The trigger condition comprises at least detecting the existence of the impairment condition.

As another example of implementing the techniques disclosed herein, a network node in one embodiment is configured for operation as part of a wireless communication network and it includes communication interface circuitry and processing circuitry operative to send and receive signals via the communication interface circuitry. In this context, the processing circuitry is configured to monitor for the existence of an impairment condition for uplink or downlink communications handled by a TRP of the wireless communication network, with the impairment condition arising from a periodicity of periodic fading affecting the uplink or downlink communications being shorter than a LA time constant for the TRP performing link adaptations with respect to the uplink or downlink communications. The LA time constant depends upon a TDD configuration of the TRP, and the processing circuitry of the network node is further configured to adapt the TDD configuration of the TRP so as to reduce the LA time constant, in response to a trigger condition being fulfilled. The trigger condition comprises at least detecting the existence of the impairment condition.

As another example, a network node configured for operation as part of a wireless communication network includes communication interface circuitry and processing circuitry operative to send and receive signals via the communication interface circuitry. The processing circuitry is configured to detect whether ongoing communications between a TRP of the wireless communication network and one or more UEs fulfill a trigger condition for reducing a LA time constant of the TRP, the LA time constant being a function of a TDD configuration of the TRP, and adapt the TDD configuration of the TRP so as to reduce the LA time constant, in response to detecting fulfillment of the trigger condition.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram of a radio environment involving a Transmission Reception Point (TRP) of a wireless communication network and a User Equipment (UE), where the UE is vulnerable to periodic fading.

FIG. 2 is a diagram of example Time Division Duplexing (TDD) configurations individually usable by a TRP, and with each TDD configuration being associated with a different Link Adaptation (LA) time constant, as a consequence of the particular ratio and distribution of uplink and downlink allocations defined as the TDD configuration.

FIGS. 10 and 11 are logic flow diagrams of respective embodiments of a method implemented by a network node, for adapting the TDD configuration of a TRP.

DETAILED DESCRIPTION

Figure 3A:
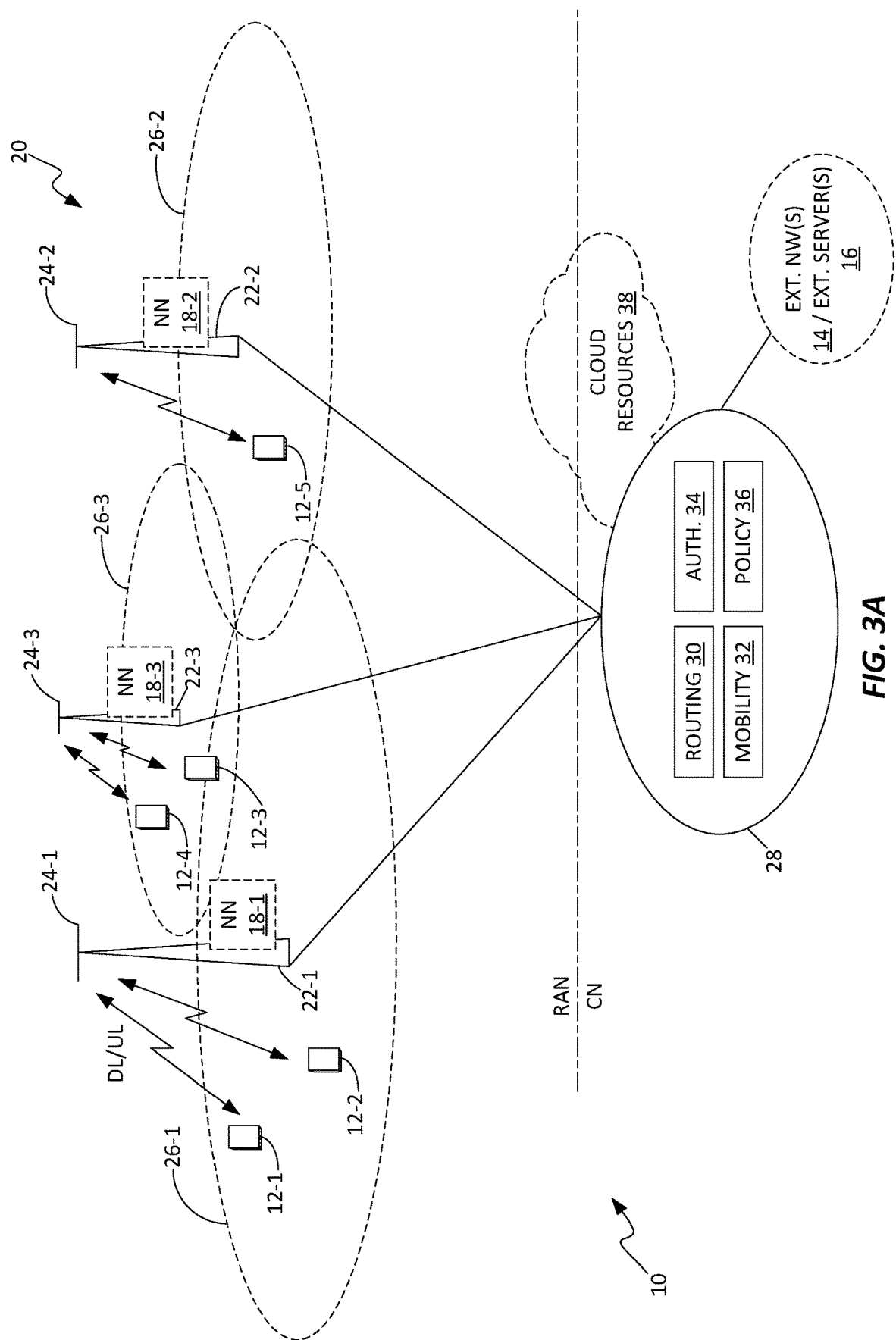
FIGS. 3A, 3B, and 3C are block diagrams of example embodiments of a wireless communication network that includes a network node that is operative to adapt the TDD configuration of a TRP.

In general, Link Adaptation (LA) algorithms, such as jump algorithms, prevent long sequences of errors when the radio link (channel) suddenly becomes bad. However, such algorithms perform less well when the radio conditions change more rapidly than the time constant of the LA algorithm. A point recognized herein is that the overall network or system performance suffers when the involved radio channels have relatively good radio quality between impairment occurrences, where the impairments occur on a time scale on par with, or slightly shorter than, the time constant of the LA algorithm.

In an example case, the jump algorithm reacts to an occurrence of link impairment by jumping back, e.g., in terms of Modulation and Coding Scheme (MCS). Depending on the specific configuration, it may take about 10 times to 100 times as long to step back up. Depending on the interval between impairment events on the radio link, the jump algorithm may not have returned to an appropriate MCS before being knocked down again, because of a negative acknowledgement of a preceding transmission. Consequently, there are scenarios, where the jump algorithm may result in the involved transmission parameters being maintained well below their optimal values, despite the link quality being good during the intervals between the impairment events. Such applies to instances where the impairments are rather short, as compared to the intervals during which the channel has good quality.

While incorporating "freeze" or "no-action" mechanisms prevent the jump algorithm from stepping back too far in the presence of burst errors, a key point recognized herein is that such mechanisms leave unaddressed scenarios where the link quality is good except for periodic impairment events occurring on a periodicity at or near the LA time constant of the jump algorithm. Of course, LA algorithms besides the jump algorithm may suffer the same or similar deleterious behavior in the presence of periodic fading.

FIG. 1 illustrates a scenario associated with periodic fading; namely, in propagation scenarios where there is a Line-of-Sight (LOS) ray and a ground-reflected ray between a Transmission Reception Point (TRP) and a User Equipment (UE), the LOS ray and the ground-reflected ray may combine at the UE constructively (add) or destructively (subtract). In particular, when the UE moves towards or away from the TRP, the two rays may exhibit a periodic alternation between adding and subtracting, meaning that the UE experiences a characteristic periodic fading. The phenomenon depends on the real-world propagation environment, carrier frequency, relevant geometries, such as antenna height(s) above the ground, and further on the velocity of the UE relative to the TRP.

Consider an example scenario where a downlink transmission beam of a beamforming TRP aligns with a highway. Vehicle-mounted or vehicle-carried UEs traveling along that stretch of highway may experience periodic fading due to two-ray ground reflection in their uplink and/or downlink connections as they approach the TRP or recede from it, with the periodicity of the fading depending on vehicle speed. For simplicity, the phrase "periodic fading" refers to the foregoing fading phenomenon, unless otherwise qualified in context. Similar effects apply to UEs integrated with or conveyed on trains moving along stretches of track that are aligned with downlink/uplink transmission beams of a TRP. If the TRP uses a LA algorithm with a LA adaptation time constant that is about the same or greater than the periodicity of periodic fading experienced by one or more UEs being served by the TRP, link adjustments will never "catch up" to or account for the periodic fading impairments.

More particularly, the periodic fading impairments will drive link adaptations towards transmission-parameter settings that are too conservative with respect to the radio-link conditions experienced between the periodic fading events. Hence, the UE(s) experiencing those conditions will operate with radio links having transmission-parameter adaptations that are too conservative, meaning that system efficiency suffers. With wireless communication networks evolving towards higher carrier frequencies, the aggressive use of beamforming, and higher bitrates, the underperformance of established LA algorithms in the presence of periodic fading will become an increasingly significant problem.

A correspondingly key recognition herein, then, is that adaptations of the Time Division Duplexing (TDD) configuration of a TRP represents an advantageous mechanism for adapting the time constant of the LA algorithm used by the TRP for performing link adaptations on the radio link(s) between it and the UEs served by it. Broadly, the term "TDD configuration" describes the duplexing arrangement applied to downlink and uplink directions, and a key aspect is that the TDD configuration used by a TRP defines the rate or number of opportunities provided for the exchange of feedback information between the TRP and its served UEs. For example, consider an example where the TRP performs link adaptations for a radio link between the TRP and a UE in dependence on the feedback of downlink measurements from the UE. The response time or time constant of the LA algorithm used to perform the link adaptations depends on how frequently the TRP receives new feedback from the UE, and the TDD configuration influences the possible feedback rates.

FIG. 2 provides a non-limiting example of possible TDD configurations that may be used by a TRP, where the letter "D" denotes a downlink allocation and "U" represents an uplink allocation. For example, the TRP uses a radio signal structure based on recurring "frames" with each frame subdivided into a number of subframes. In that context, each "D" in FIG. 2 may represent a subframe allocated for downlink transmissions and "U" may represent a subframe allocated for uplink transmissions. The TDD configuration denoted as "#0" has many more uplink subframes than downlink subframes and may be an advantageous configuration to use when there is more uplink traffic than downlink traffic. Conversely, the TDD configuration denote as "#/V" has many more downlink subframes than uplink subframes and may be an advantageous configuration to use when there is more downlink traffic than uplink traffic.

Of course, there may be many defined TDD configurations that can be used at the TRP and the pattern or distribution of uplink and downlink subframes is also an important consideration. Compare the "#1" configuration in FIG. 2 with the "#2" configuration. While both configurations may have an overall 1:1 ratio of downlink-to-uplink subframes, the #1 configuration offers a uniform distribution of alternating downlink and uplink subframes, whereas the #2 configuration includes a run of downlink subframes followed by a run of uplink subframes. As such, recognizing that the TDD configuration influences the time constant of the LA algorithm employed by a TRP encompasses at least two aspects. First, the "TDD ratio" of uplink and downlink allocations represents one factor that determines how frequently LA feedback can be exchanged between the served UEs and the TRP. Second, the "TDD pattern" of uplink and downlink allocations—the distribution or arrangement of uplink and downlink allocations over a defined interval, such as a frame—represents another factor that determines how frequently LA feedback can be exchanged between the served UEs and the TRP.

Figure 3B:
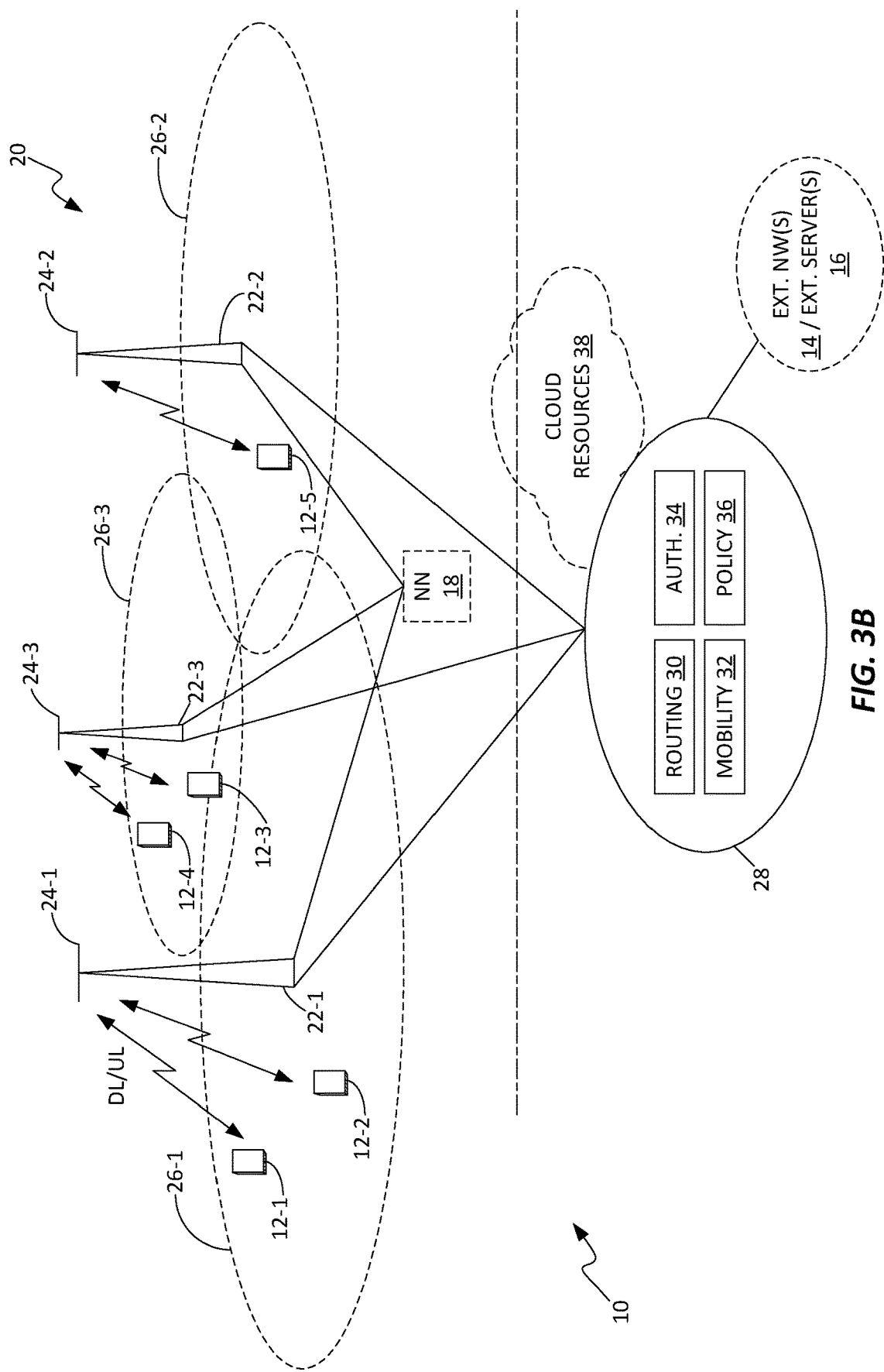
Figure 3C:
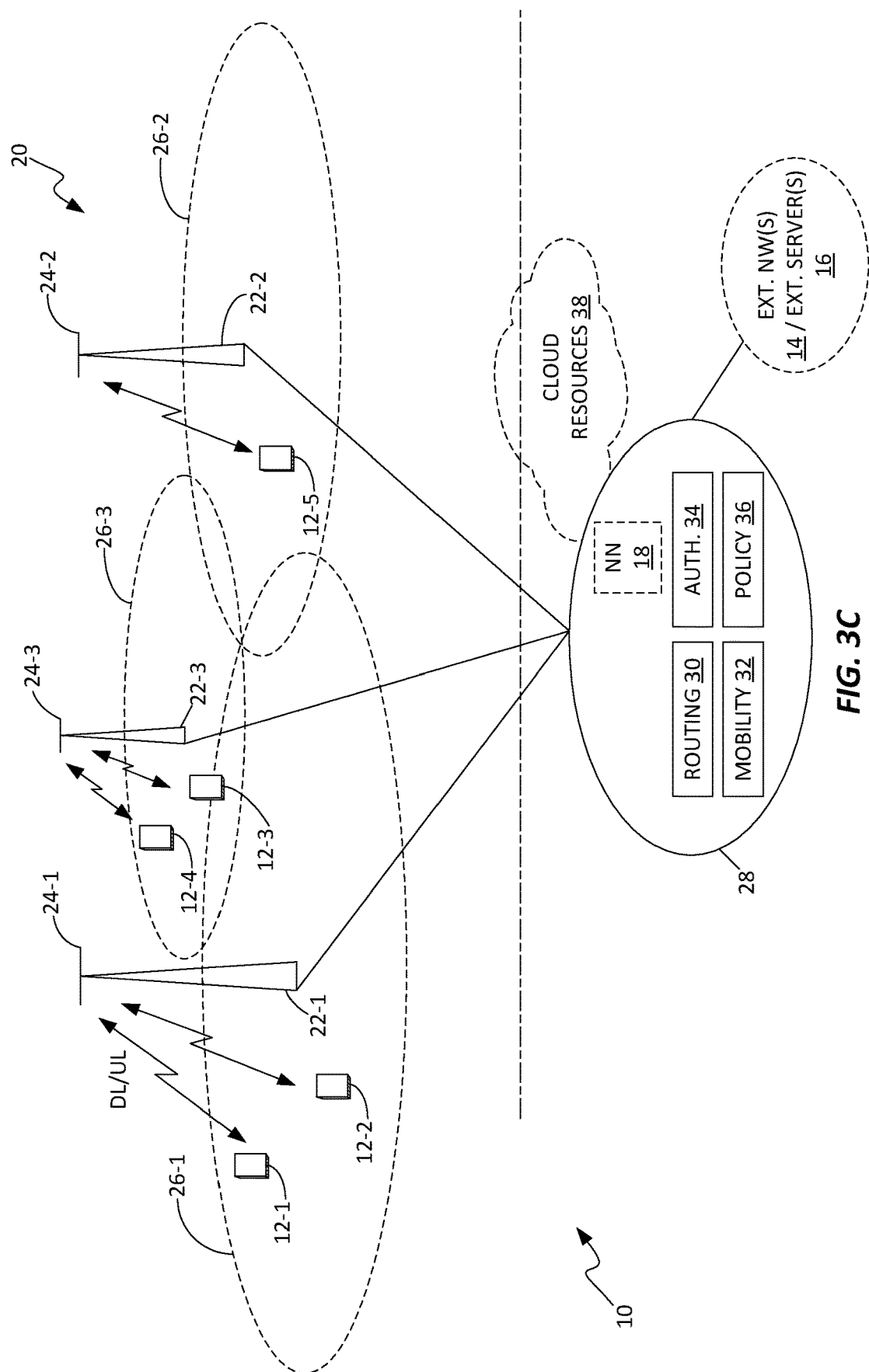

FIGS. 3A, 3B, and 3C illustrate example embodiments of a wireless communication network 10 that includes one or more entities operative to trigger TDD configuration adaptations at one or more TRPs in the network, to ameliorate the problem(s) arising when the periodicity of fading approaches the time constant of the LA algorithm(s) in use at the TRP(s). The wireless communication network 10—"network 10"—comprises, for example, a Third Generation Partnership Project (3GPP) network, such as a Fifth Generation (5G) New Radio (NR) network.

The depicted network 10 provides communication services to one or more User Equipments (UEs) 12, with UEs 12-1, 12-2, 12-3, 12-4, and 12-5 depicted by way of example. For the reference number "12," suffixing may be used for clarity, but the number "12" without suffixing may also be used, either to refer to UEs in a singular or a plural sense. The same approach holds for other references numbers that may have suffixing in the drawings.

Providing communication services to the UEs 12 comprises, for example, providing access to one or more external networks ("NW(s)") 14, which may include or provide access to one or more servers 16. For example, the network 14 is the Internet or another Packet Data Network (PDN). Broadly, the communication services provided by or through the network 10 include, for example, voice services, data services, messing services, machine-communication services, etc. The particular services used by a given UE 12 depends on its capabilities and intended use, and the UEs 12 may be of the same or different types, e.g., a mix of smartphones, mobile computing devices, Machine Type Communication (MTC) devices, etc. As such, the term "User Equipment" has broad meaning, with the "User" component of the term denoting equipment that uses the network 10 rather than entities that belong to the network infrastructure. In an example case, one or more of the UEs may be embedded, such as integrated into automobiles for Vehicle-to-Everything (V2X) operations.

A Radio Access Network (RAN) 20 portion of the network 10 includes one or more TRPs 22, with TRPs 22-1, 22-2, and 22-3 shown by way of example. The TRPs 22 may or may not be of like types and capabilities, e.g., they may have different transmit-power capabilities, different antenna arrangements, etc. Thus, although each TRP 22 is depicted with a corresponding antenna system 24 and a corresponding coverage area 26, there may be differences in the antenna systems 24 and/or the coverage areas 26. At least one of the TRPs 22 is configured for beamforming operations, e.g., transmit beamforming and/or uplink beamforming, with the antenna system 24 comprising, for example, an array of antenna elements supporting beamforming. Correspondingly, although the coverage areas 26 appear uniform, one or more of the TRPs 22 may use a plurality of directional transmission and/or reception beams to "cover" the depicted coverage area.

A Core Network (CN) portion 28 of the network 10 provides, among other functions, routing, authentication, mobility control, and policy control for UEs 12 served via the RAN 20. One or more routing nodes 30, authentication nodes 34, mobility management nodes 32, and policy control nodes 36 cooperate to provide the various core-network functionality. At least some of the CN nodes may be implemented in a cloud-computing or data-center computing environment, e.g., via virtualized instantiation on data-center servers, which are broadly denoted as "cloud resources" 38 in the diagram. Of course, the cloud resources 38 may additionally or alternatively support RAN functionality, and, correspondingly, they are showing as extending into or otherwise supporting the RAN 20.

Various details regarding the network 10 may be varied as a function of intended use and network type, e.g., different "generations" of standards-based networks may split, rearrange, or add functions and the nodal/functional nomenclature may change accordingly. Such details are, in general, not germane to the techniques of interest herein, which are represented by way of example via a network node 18 ("NN" in FIGS. 3A, 3B, and 3C) and its associated functionality.

FIG. 3A depicts a copy or instantiation of the network node 18 at each of the three example TRPs 22, e.g., a network node 18-1 at the TRP 22-1, a network node 18-2 at the TRP 22-2, and a network node 18-3 at the TRP 22-3. Each network node 18 in this scenario may be co-located with or even integrated within its respective TRP 22. In one such example, communications between network nodes 18 may be carried out using inter-TRP communication links, albeit with appropriate protocol provisions or extensions. Alternatively, the network nodes 18 may include dedicated interfaces and protocols for exchanging communications. As a further alternative, at least some of the functionality of the network node(s) 18 resides in the cloud resources 38, with corresponding connectivity into the RAN 20.

FIG. 3B differs from FIG. 3A by depicting an alternative implementation that involves a centralized implementation of the network node 18. A single network node 18 serves all three TRPs 22-1, 22-2, and 22-3 in the depicted example. More generally, the network 10 may include multiple network nodes 18, with each one serving a given number of TRPs 22, or with individual network nodes 18 allocated to defined "areas" of the network 10, such as defined mobility or tracking areas. With centralization, a given network node 18 may be co-located with a given TRP 22 and provide processing and control for multiple TRPs 22, or it may reside physically and geographically separate from any of the TRPs 22 that it supports. A centralized network node 18 may be at least partly implemented via the cloud resources 38.

FIG. 3C illustrates another implementation example, where one or more network nodes 18 reside in the CN 28, meaning that the network node(s) 18 communicate with one or more corresponding TRPs 22 in the RAN 20. A CN-based implementation of the network node 18, or any number of copies or instantiations thereof, means that the network node 18 may be co-located with or integrated within another node in the CN 28, or may be implemented as a stand-alone node within the CN 30. And, as with the other embodiments, the network node(s) 18 may be at least partly implemented in the cloud resources 38.

However it is implemented, a given network node 18 as contemplated herein provides advantageous control of the TDD configuration used by a TRP 22, based on triggering an adaptation of the TDD configuration in response to detecting fulfillment of a trigger condition for adaptation, where the trigger condition involves the detection of communication impairments arising from periodic fading on one or more of the radio links supported by the TRP 22. While not so limited, operation of the network node 18 may have particular advantages in cases where the TRP 22 covers one or more areas using directional transmission or reception beams.

Figure 4:
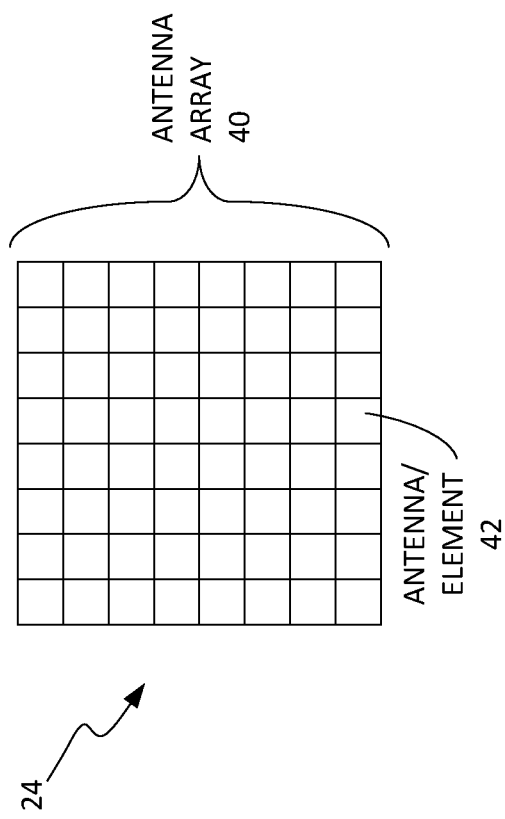
FIG. 4 is a block diagram of one embodiment of an antenna system, suitable for use by a TRP in performing transmission or reception beamforming.

FIG. 4 illustrates an example antenna system 24 for a TRP 22 that is configured for beamforming operation. Included in the antenna system 24 is an antenna array 40 comprising a plurality of antenna elements 42. With 5G NR and future evolutions of wireless networks, the antenna array 40 may comprise a relatively large number of antenna elements 42, allowing for narrow, high-gain transmission and/or reception beams. As noted earlier, one or more beam directions may align with coverage areas where served UEs 12 are particularly vulnerable to periodic fading, such as beams that align with a stretch of highway, a stretch of train tracks, etc. Here, a UE 12 is a "served UE" with respect to a TRP 22 if it has a radio link with the TRP 22.

Figure 5:
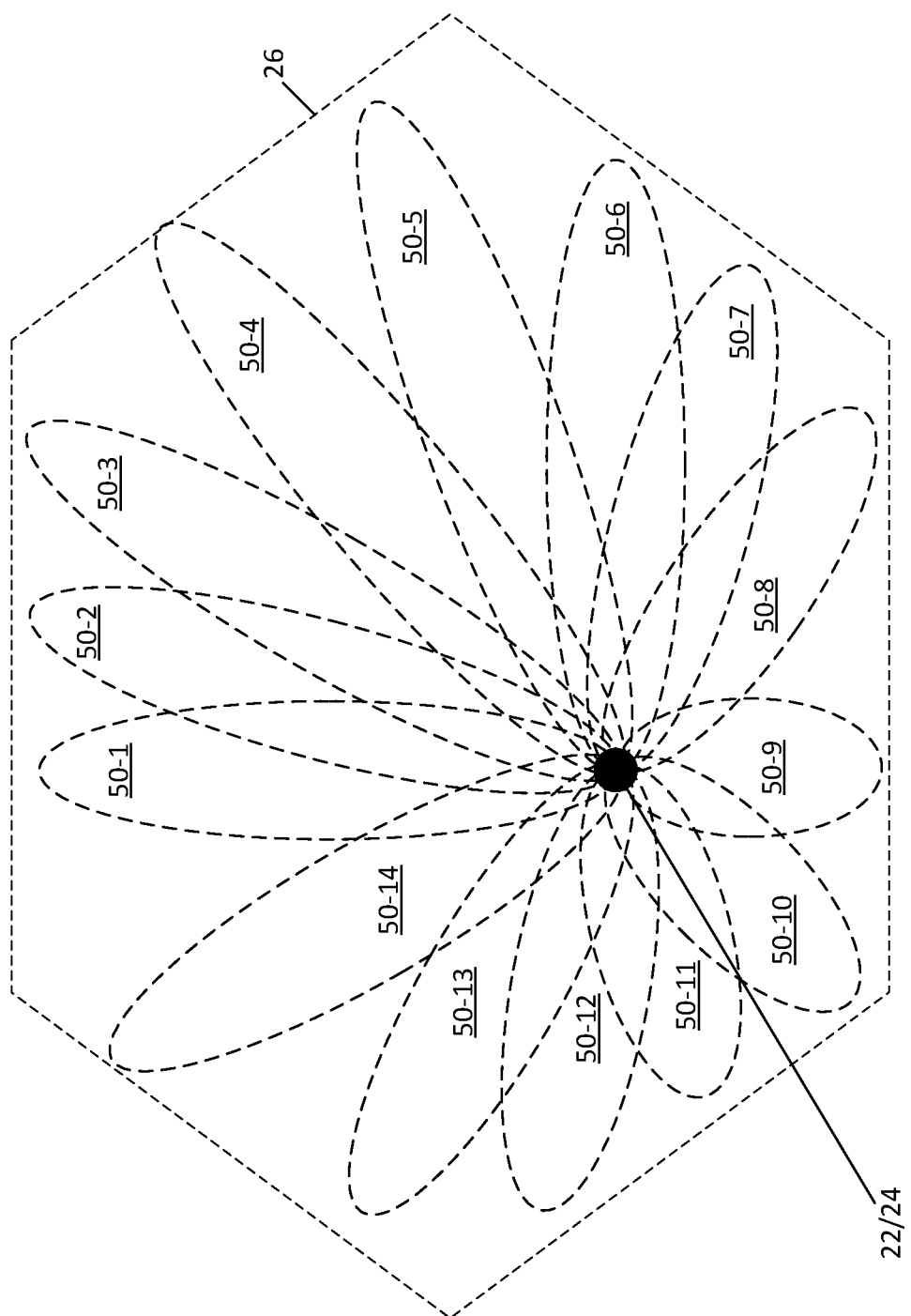
FIG. 5 is a diagram of an example set of beams used by a TRP.

FIG. 5 illustrates an example beamforming scenario for a TRP 22 and its associated antenna system 24. The TRP 22 provides radio coverage for a given overall coverage area 26 using a plurality of directional beams 50, e.g., 50-1 through 50-14. The beams 50 may represent direction transmission, directional reception, or both. In a transmit-beam example, the TRP 22 may transmit each beam 50 individually, in a sequence or pattern referred to as a "beam sweep".

Figure 6:
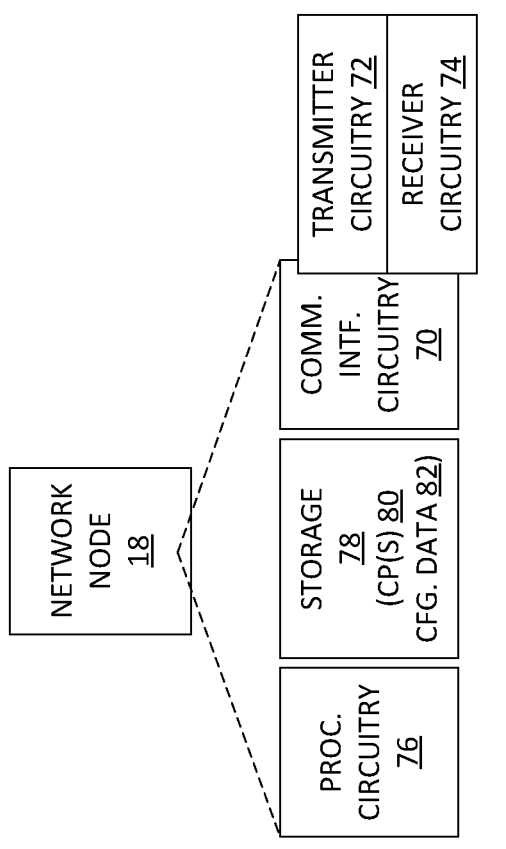
FIG. 6 is a block diagram of one embodiment of a network node that is operative to adapt the TDD configuration of a TRP.

FIG. 6 illustrates an example implementation of a network node 18, with the understanding that the depicted embodiment is non-limiting. Other arrangements of processing and communication circuitry may be used to realize the functionality described herein for the network node 18.

Elements of the example network node 18 include communication interface circuitry 70, including transmitter circuitry 72 and receiver circuitry 74. Further elements include processing circuitry 76 and integrated or associated storage 78, such as may be used for holding one or more computer programs 80 ("CPs") or configuration data 82 ("CFG. DATA").

The implementation details of the communication interface circuitry 70 depend on whether the network node 18 is standalone or integrated with another node in the network 10, or implemented at least partly within the cloud resources 18. In general, however, the communication interface circuitry 70 includes wireline or wireless physical-layer circuitry configured for transmitting and receiving over the involved propagation medium. Non-limiting examples include inter-processor or inter-server parallel or serial bus interface circuitry or computer-network interface circuitry, such an Ethernet-based interface circuitry.

The processing circuitry 76 is operatively associated with the communication interface circuitry 70, e.g., it is configured to send and receive messages or other signaling via the communication interface circuitry 70. The processing circuitry 76 comprises programmed circuitry or fixed circuitry, or a combination of programmed and fixed circuitry. In an example embodiment, the processing circuitry 76 comprises one or more microprocessors, Digital Signal Processors (DSPs), Field Programmable Gate Arrays (FPGAs), Application Specific Integrated Circuits (ASICs), or other digital processing circuits.

In at least one embodiment, the processing circuitry 76 is configured at least in part based on its execution of computer instructions included in one or more computer programs 80 stored in the storage 78. As noted, the storage 78 may also store one or more items of configuration data 82 associated with operation of the network node 18. The storage 78 comprises, for example, one or more types of computer-readable media, such as a Solid State Disk (SSD), FLASH, DRAM, SRAM, etc. In one embodiment, the storage 78 provides for long-term storage of the computer program(s) 80, and further provides working memory for operation of the processing circuitry 76.

With the example details of FIG. 6 in mind, a network node 18 is configured for operation as part of a wireless communication network, e.g., the network 10. The network node 18 includes, for example, communication interface circuitry 70 and processing circuitry 76 that is operative to send and receive signals via the communication interface circuitry. Further, the processing circuitry 76 is configured to (a) detect whether ongoing communications between a TRP 22 of the network 10 and one or more UEs 12 fulfill a trigger condition for reducing a LA time constant of the TRP 22, where the LA time constant is a function of a TDD configuration of the TRP 22, and (b) adapt the TDD configuration of the TRP 22 so as to reduce the LA time constant, in response to detecting fulfillment of the trigger condition.

Referring back to FIG. 2 momentarily, the network node 18 indicating to the TRP 22 a change from the #2 TDD configuration to the #1 TDD configuration stands as one example of the kind of adaptation that reduces the LA time constant of the TRP 22, by providing more opportunities of exchanging LA feedback or providing a more uniform distribution of opportunities for exchanging LA feedback. In a case where the TDD configuration used by a TRP 22 must be one in a predefined set of TDD configurations, the processing circuitry 76 may be configured to identify a "best" one among two or more available TDD configurations that are known or estimated as providing the requisite reduction in the LA time constant. Here, "best" may be qualified in terms of achieving the desired reduction in the LA time constant without unnecessarily compromising the balance of uplink and downlink resource allocations for given traffic characteristics.

In a more-detailed or alternative example, the network node 18 is configured for operation as part of a wireless communication network, e.g., the network 10, and it includes communication interface circuitry 70 and processing circuitry 76 that is operative to send and receive signals via the communication interface circuitry 70. The processing circuitry 76 is configured to monitor for the existence of an impairment condition for uplink or downlink communications handled by a TRP 22 of the network 10.

The impairment condition arises from a periodicity of periodic fading affecting the uplink or downlink communications being shorter than a LA time constant for the TRP 22 performing link adaptations with respect to the uplink or downlink communications, and the LA time constant depends upon a TDD configuration of the TRP 22. In this sense, monitoring for the impairment condition can be understood as monitoring for a pattern or patterns of fading where fading event recur with a periodicity that is in the range of or faster than the LA time constant.

Correspondingly, responsive to a trigger condition being fulfilled, the processing circuitry 76 is configured to adapt the TDD configuration of the TRP 22 so as to reduce the LA time constant. The trigger condition comprises at least detecting the existence of the impairment condition. That is, detection of the impairment condition alone may constitute the trigger condition, or the trigger condition may include one or more additional qualifiers, i.e., the impairment condition must be detected and one or more other conditions must be satisfied in order to trigger an adaptation of the TDD configuration of the TRP 22.

In one example, the processing circuitry 76 is configured to monitor for the existence of the impairment condition by determining whether a monitored performance level for the uplink or downlink communications is below an expected performance level associated with prevailing radio-signal reception conditions between the TRP 22 and one or more UEs 12 involved in the uplink or downlink communications. For example, the processing circuitry 76 may not respond to its detection of the impairment condition unless it also determines that the MCS or other transmission parameter(s) controlled via LA are being maintained at or being driven to values lower than "expected" for the prevailing radio conditions.

Consider an example radio link between the TRP 22 and a UE 12 and assume that the periodic fading experienced at the UE 12 causes a periodic drop in received-signal quality, with the received-signal quality otherwise being in a good range during the times between fading events. In this case, the processing circuitry 76 may deduce that the failure of the TRP to return the involved transmission parameter(s) to suitable values during the intervals between fading events is evidence that the LA time constant of the TRP's link adaptation algorithm is too long in relation to the fading periodicity.

Additionally, or alternatively, the processing circuitry 76 in one or more embodiments is configured to monitor for the existence of the impairment condition, by detecting the periodic fading by evaluating one or more radio-signal reception parameters for the uplink or downlink communications and determining whether the periodicity of the detected periodic fading is shorter than the LA time constant. Evaluating the one or more radio-signal reception parameters for the uplink or downlink communications comprises, for example, evaluating downlink signal-strength or signal-quality reports from the one or more UEs 12, as reported over one or more periods of time. Such operations may be augmented by or replaced by the processing circuitry monitoring for the existence of the impairment condition by evaluating communication error rates for the uplink or downlink communications and determining whether the communication error rates correlate with the detected periodic fading.

In at least one embodiment, the processing circuitry 76 is configured to deem the impairment condition to be existent in response to the monitored performance level being below the expected performance level, the periodicity of the detected periodic fading being shorter than the LA time constant, and the communication error rates correlating with the detected periodic fading. That is, the processing circuitry 76 may define the impairment condition as a combination of subordinate conditions and deem the impairment condition to exist in response to all such subordinate conditions being satisfied. Such an approach has certain advantages. For example, there may be circumstances where the deleterious effects of periodic fading are not serious enough to warrant changing the TDD configuration of the TRP 22, or where the amount of traffic, the number of UEs 12, or the type(s) of traffic affected by periodic fading does not warrant changing the TDD configuration of the TRP 22.

In one or more embodiments, the network node 18 is pre-provisioned with threshold data or other qualifiers for use in determining whether the trigger condition for adapting the TDD configuration is satisfied, with such data being held as the configuration data 82 depicted in FIG. 6. In other embodiments, such data flows to the network node 18 via an Operations Support System (OSS) or an Operations and Maintenance (OAM) node of the network 10.

In the context of the processing circuitry 76 monitoring for the existence of the impairment condition based on determining whether a monitored performance level for uplink or downlink communications is below and expected performance level associated with prevailing radio-signal reception conditions between the TRP 22 and one or more UEs 12 involved in the uplink or downlink communications, the word "prevailing" denotes the overall (average or longer-term) conditions or the conditions existing between periodic fading events. Correspondingly, the word "expected" denotes a throughput, data rate, error rate, or transmit parameter value or level that would normally attain for prevailing conditions. The processing circuitry 76 may observe, for example, an MCS value/setting that is lower than the value/setting that is nominal or optimal for the prevailing conditions. Of course, these evaluations may be qualified, e.g., using thresholds, filters, or other tolerances, so that the processing circuitry 76 does not deem the impairment condition to exist unless the monitored performance level is below the expected level for a qualified period of time or by a qualified extent.

In at least one implementation, the monitored performance level is at least one of: monitored transmit-modulation orders, monitored transmit-coding rates, or monitored communication error rates. Here, the expected performance level is one or more corresponding ones of: expected transmit-modulation orders, expected transmit-coding rates, or expected communication error rates.

The processing circuitry 76 in one or more embodiments is configured to choose whether to monitor for the existence of the impairment condition for the uplink communications and not for the downlink communications, or for the downlink communications and not for the uplink communications, in dependence on whether a greater amount of user traffic flows in the uplink direction or in the downlink direction. Of course, the network node 18 may be configured to monitor for the impairment condition in both the uplink and downlink directions but it may not trigger an adaptation of the TDD configuration of the TRP 22 unless it detects periodic fading and concomitant underperformance for the link direction carrying the most traffic or the most critical traffic.

In at least some embodiments, the TRP 22 operates with beamforming that defines multiple beams 50, such as shown in the example of FIG. 5. In at least one such embodiment, the processing circuitry 76 of the network node 18 is configured to monitor for the existence of the impairment condition with respect to one or more individual ones of the multiple beams 50. For example, the network node 18 may learn or be configured with information indicating that it should not monitor for existence of the impairment condition in one or more beams 50 or, more generally, beam directions. Conversely, the network node 18 may learn or be configured with information indicating that it should monitor for existence of the impairment condition in one or more beams 50 or, more generally, beam directions. Such selectivity reduces the computing load of the network node 18, which saves power, for example, or allows for lower processing complexity. Further, such selectively reflects the advantageous recognition that there may be certain service areas/beams where periodic fading is more likely or has been observed, such as for beams that align with roadways or other transit avenues, such that the UEs 12 in such areas are likely to be moving towards or away from the involved TRP 22 at speeds associated with fading periodicities fast enough to outpace the LA used by the TRP 22.

Figure 7:
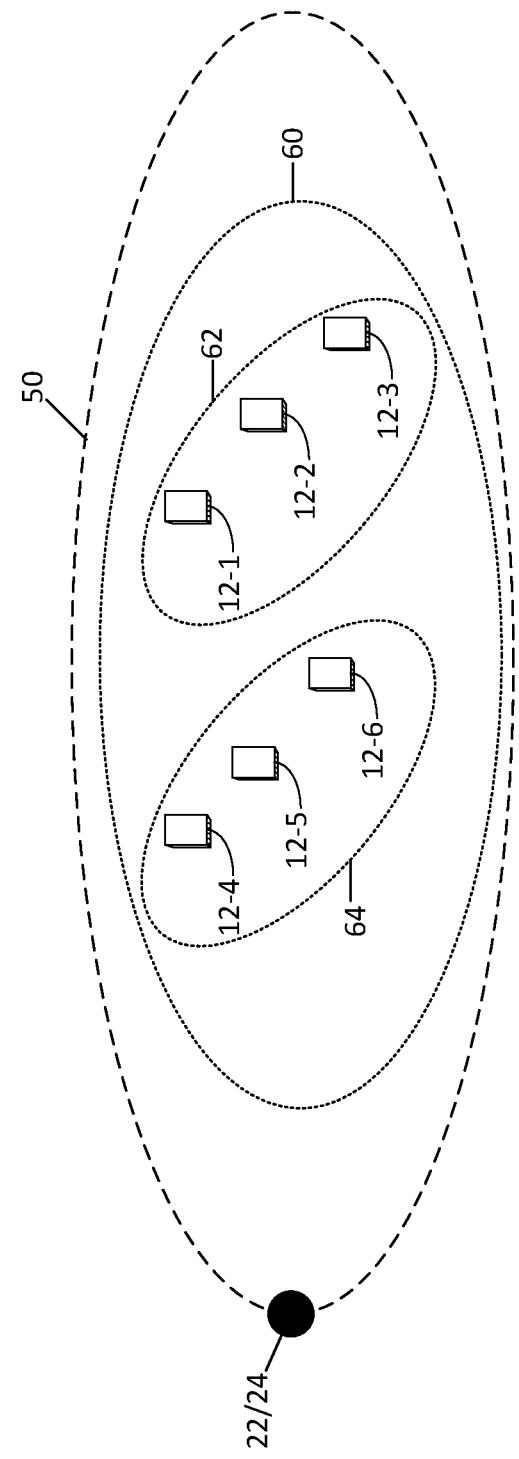
FIG. 7 is a diagram of an example scenario involving a plurality of users served by a particular beam associated with a TRP, where some users experience an impairment condition associated with periodic fading and other users do not.

In one or more scenarios, a TRP 22 serves a plurality of UEs 12, which may be referred to as users. Consider a case where the processing circuitry 76 of the network node 18 determines that the impairment condition is existent, where a subset of the users is affected by the impairment condition and are referred to as impaired users and a remaining subset of the users is not affected by the impairment condition and is referred to as unimpaired users. FIG. 7 illustrates such a scenario, where a TRP 22/antenna system 24 serves a plurality of users 60 in a given beam 50, where a subset of the users 60 is affected by periodic fading (e.g., affected users 62 including UEs 12-1, 12-2, and 12-3), and another subset of the users is not affected by periodic fading (e.g., unaffected users 64 including UEs 12-4, 12-5, and 12-6). Here, the term "affected by periodic fading" should be understood in the context of defining an impairment condition in which the LA time constant of the TRP 22 may not be fast enough to keep up with periodic fading being experienced by the affected users 62.

In such scenarios, the processing circuitry 76 in one or more embodiments is configured to determine whether the trigger condition for adapting the TDD configuration of the TRP 22 is fulfilled by comparing the number of affected users 62 to the number of unaffected users 64, or by comparing an aggregate user traffic amount or throughput for the affected users 62 to an aggregate user traffic amount or throughput for the unaffected users 64. Alternatively, the processing circuitry 76 may estimate a net change in throughput or a net change in some other overall performance metric that considers the users 60, with the net change assessed by comparing the current value of the metric for the current TDD configuration of the TRP 22 with a predicted (estimated) value of the metric for the contemplated new TDD configuration of the TRP 22.

Figure 8:
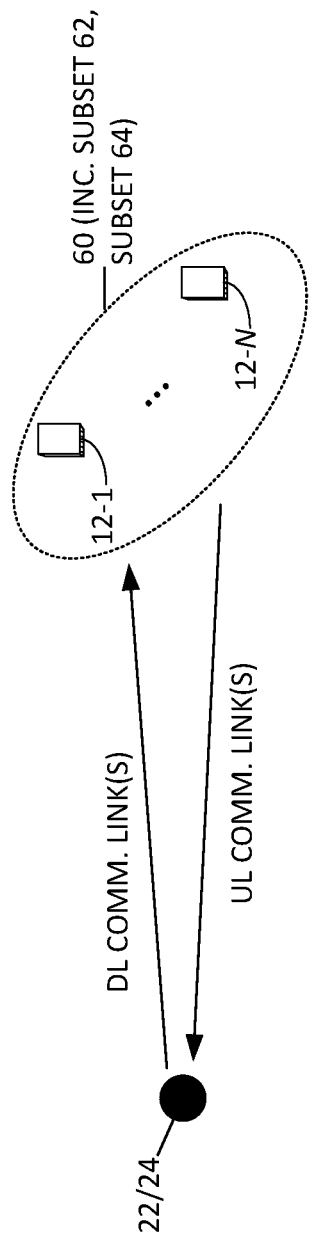
FIG. 8 is a diagram of another example scenario involving a mix of impaired and unimpaired users served by a TRP.

FIG. 8 illustrates a similar implementation example, without necessarily involving beamforming. Here, the TRP 22 serves a set of users 60, including a subset of affected users 62 and a subset of unaffected users 64, where "affected" and "unaffected" refer to the fading problems described herein. The processing circuitry 76 may detect the impairment condition and then decide whether to trigger an adaptation of the TDD configuration of the TRP 22 in dependence on the size of the subset 62 versus the subset 64, or in dependence on the amounts or criticality of the traffic respectively associated with the two subsets 62 and 64.

As noted earlier, a TDD configuration defines a pattern of uplink transmission intervals and downlink transmission intervals within a defined window. Correspondingly, The processing circuitry 76 is configured to adapt the TDD configuration of a TRP 22 so as to reduce the LA time constant by changing the pattern to increase the number of uplink transmission intervals or change the distribution of uplink transmission intervals within a defined window—e.g., the time span represented by a defined TDD configuration—to reduce a delay between consecutive uplink transmission intervals. Also, as noted, the network node 18 may be integrated with a TRP 22 or may be a node that is physically separate from the TRP 22 and communicatively coupled to the TRP 22.

Figure 9:
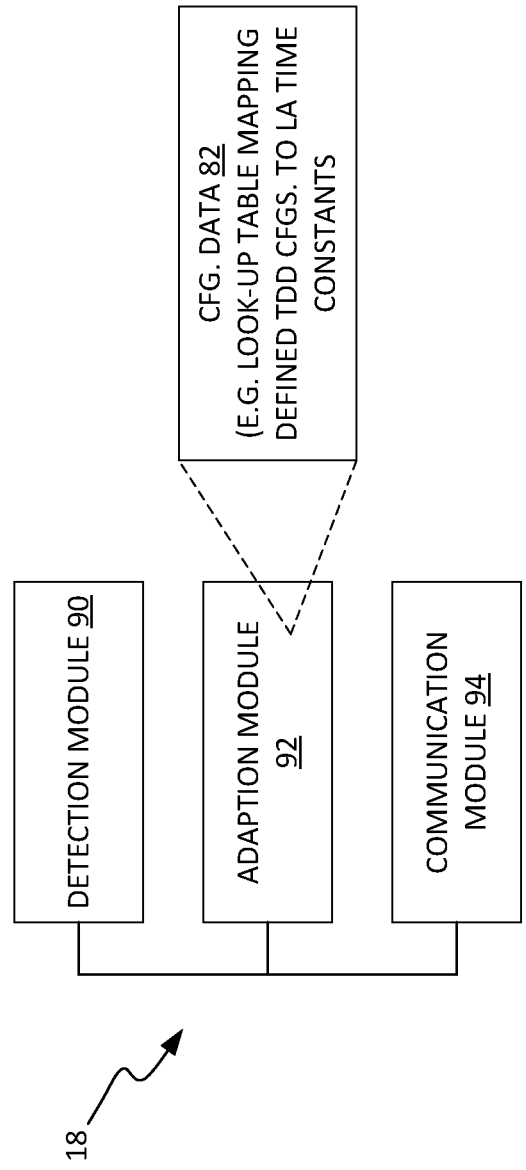
FIG. 9 is a block diagram of one embodiment of a network node that is operative to adapt the TDD configuration of a TRP.

FIG. 9 illustrates yet another embodiment of the network node 18, where the network node 18 may be regarded as a virtual machine implemented, for example, as computer processing units or functional modules that are configured to carry out the operations described herein. Nonetheless, the depicted units or modules involve physical processing and communication circuits.

In the example, the network node 18 includes a detection module 90 that is configured to monitor for the existence of an impairment condition for uplink or downlink communications handled by a TRP 22 of a wireless communication network, such as the network 10. The impairment condition of interest here arises from a periodicity of periodic fading affecting the uplink or downlink communications being shorter than a LA time constant for the TRP 22 performing link adaptations with respect to the uplink or downlink communications. The LA time constant depends upon the TDD configuration of the TRP 22—i.e., the TDD configuration currently in use at the TRP 22.

The network node 18 further includes an adaption module 92. Responsive to a trigger condition being fulfilled, the adaption module 92 adapts the TDD configuration of the TRP 22 so as to reduce the LA time constant. For example, among a set of defined TDD configurations, the adaption module 92 selects one of the TDD configurations in the set that provides more uplink transmission opportunities than the TDD configuration currently in use at the TRP 22. The trigger condition comprises at least detecting the existence of the impairment condition, but it may include further qualifications, such as assessment of the impact of the impairment condition on system efficiency, e.g., in terms of throughput. The communication module 94 is configured, for example, for communicating with one or more TRPs 22, e.g., to effect TDD configuration changes at the TRP(s) 22.

With respect to programmatic implementation of the functionality described for a network node 18 herein, in at least one embodiment, a computer-readable medium stores computer program instructions that, when executed by a microprocessor or other processing circuit of a network node 18 in a wireless communication network 10, configures the network node 18 to: (a) monitor for the existence of an impairment condition for uplink or downlink communications handled by a TRP 22 of the network 10, where the impairment condition arises from a periodicity of periodic fading affecting the uplink or downlink communications being shorter than a Link Adaptation (LA) time constant for the TRP 22 performing link adaptations with respect to the uplink or downlink communications, and where the LA time constant is dependent upon a TDD configuration of the TRP 22; and (b) responsive to a trigger condition being fulfilled, adapt the TDD configuration of the TRP 22 so as to reduce the LA time constant, and where the trigger condition comprises at least detecting the existence of the impairment condition.

In related example details, the computer program instructions are stored as one or more computer programs (CPs) 80, as seen in FIG. 6, with the storage 78 constituting one or more types of computer-readable media that provides storage of at least some persistence for the computer program instructions, e.g., in one or both of a long-term or non-volatile storage medium and a short-term or volatile medium, such as working computer memory used for program execution. In either case, the storage constitutes non-transitory storage of at least some minimum persistence, wherein the computer program instructions are held for execution or recall.

FIG. 10 illustrates an example method 1000 of operation by a network node 18. The method 1000 may be carried out on a continuing or repeating basis, e.g., with respect to the described monitoring operations. In at least one embodiment, the processing circuitry 76 of the network node 18 comprises one or more microprocessors or other computer circuitry that is configured to carry out the method 1000 based on executing computer program instructions from one or more computer programs 80 held in the storage 78.

Regardless of the implementation details, the method 1000 includes the network node 18 monitoring (Block 1002) for the existence of an impairment condition for uplink or downlink communications handled by a TRP 22 of the network 10. The impairment condition arises from a periodicity of periodic fading affecting the uplink or downlink communications being shorter than a LA time constant for the TRP 22 performing link adaptations with respect to the uplink or downlink communications. The LA time constant depends upon a TDD configuration of the TRP 22. Further, responsive to a trigger condition being fulfilled, the method 1000 includes the network node 18 adapting (Block 1004) the TDD configuration of the TRP 22 so as to reduce the LA time constant, the trigger condition comprising at least detecting the existence of the impairment condition.

Monitoring (Block 1002) for the existence of the impairment condition comprises, for example, determining whether a monitored performance level for the uplink or downlink communications is below an expected performance level associated with prevailing radio-signal reception conditions between the TRP 22 and one or more UEs 12 involved in the uplink or downlink communications. Such monitoring may further comprise the network node 18 detecting the periodic fading by evaluating one or more radio-signal reception parameters for the uplink or downlink communications and determining whether the periodicity of the detected periodic fading is shorter than the LA time constant of the TRP 22. Here, the network node 18 may learn or be configured with LA time constants applicable to each of the possible TDD configurations, e.g., nominal or worst-case values.

Evaluating the one or more radio-signal reception parameters for the uplink or downlink communications comprises, for example, evaluating downlink signal-strength or signal-quality reports from the one or more UEs 12, as reported over one or more periods of time. Additionally, or alternatively, monitoring (Block 1002) for the existence of the impairment condition comprises the network node 18 evaluating communication error rates for the uplink or downlink communications and determining whether the communication error rates correlate with the detected periodic fading.

For example, the network node 18 deems the impairment condition to be existent in response to the monitored performance level being below the expected performance level, the periodicity of the detected periodic fading being shorter than the LA time constant, and the communication error rates correlating with the detected periodic fading. In at least one embodiment, the monitored performance level is at least one of: monitored transmit-modulation orders, monitored transmit-coding rates, or monitored communication error rates. The expected performance level is one or more corresponding ones of: expected transmit-modulation orders, expected transmit-coding rates, or expected communication error rates.

The method 1000 may further include the network node 18 choosing whether to monitor for the existence of the impairment condition for the uplink communications and not for the downlink communications, or for the downlink communications and not for the uplink communications, in dependence on whether a greater amount of user traffic flows in the uplink direction or in the downlink direction.

In situations where the TRP 22 operates with beamforming that defines multiple beams monitoring (Block 1002) for the existence of the impairment condition comprises, for example, the network node 18 monitoring for the existence of the impairment condition with respect to individual ones of one or more of the multiple beams 50. The TRP 22 may serve a plurality of UEs 12, referred to as users 60. In related example operations, the network node 18 determines that the impairment condition is existent, with a subset of the users 60 affected by the impairment condition and being referred to as impaired users 62 and a remaining subset of the users 60 not affected by the impairment condition and being referred to as unimpaired users 64. Here, the method 1000 may further include the network node 18 determining whether the trigger condition is fulfilled based on comparing the number of impaired users 62 to the number of unimpaired users 64, or comparing an aggregate user traffic amount or throughput for the impaired users 62 to an aggregate user traffic amount or throughput for the unimpaired users 64.

FIG. 11 illustrates a method 1100 of operation by a network node 18, and can be understood as a variation or embodiment of the method 1000. According to the method 1100, the network node 18 detects (Block 1102) whether a trigger condition for reducing a LA time constant of a TRP 22 is fulfilled, where the LA time constant is a function of a TDD configuration of the TRP 22. The method 1100 further includes, in response to the network node 18 detecting fulfillment of the trigger condition, the network node 18 adapting (Block 1104) the TDD configuration of the TRP 22 so as to reduce the LA time constant.

As noted before, the network node 18 may store a time value or a related value corresponding to each possible TDD configuration of the TRP 22 and compare such values to a detected fading periodicity, where the detected fading periodicity may be based on measurements for one radio link or multiple radio links, e.g., a collection of measurements made over one or more intervals with respect to multiple UEs 12. The network node 18 may consider not only the time(s) between feedback opportunities for a given TDD configuration, but also consider the distribution of feedback opportunities within the given TDD configuration. For example, although a run of uplink subframes within a given TDD configuration allows for quick uplink feedback within that run, there may be a large number of intervening, consecutive downlink subframes before the next run of uplink subframes. As such, the TDD configuration has a worst-case feedback delay that must be considered when determining whether adopting it would reliably allow for the desired reduction in the LA time constant of the TRP 22.

Broadly, the technique disclosed herein involves triggering an adaptation of the TDD configuration used by a TRP 22, based on fading periodicity detected on one or more radio links supported by the TRP 22. In the context of a set of fixed or statically defined TDD configurations, adapting the TDD configuration used by a TRP 22 comprises changing from one TDD configuration in the set to another one in the set. However, "adapting" the TDD configuration of a TRP 22 also includes dynamically adjusting the TDD configuration that is in use, to change link directions for one or more time slots or other constituent intervals used by the TDD configuration. See, for example, the "flexible" slot/symbol details in 3GPP, TS 38.213, V15.3.0, October 2018. Such flexibility allows, for example, dynamic adaptation of the TDD configuration used by a TRP 22, based on temporarily reversing the link direction for particular symbols within a slot. Here, "slot" refers to an interval defined by a radio-signal time structure that includes recurring frames, with each frame including subframes, and with each subframe including one or more slots.

As such, "adapting" the TDD configuration used by a TRP can be understood as changing from one static TDD configuration to a new static TDD configuration, or as dynamically modifying the TDD configuration in use at the TRP 22, to change the number and/or distribution of relevant feedback opportunities. Here, a relevant "feedback opportunity" refers to an opportunity for a receiver to provide feedback to a transmitter, for LA use by the transmitter towards the receiver. As one example, for LA with respect to downlink transmissions a "feedback opportunity" is an uplink subframe, because it represents an opportunity for one or more UEs 12 to send measurement reports to the TRP 22, indicating one or more aspects of received-signal quality at the UEs 12, such as Reference Signal Strength Indicator (RSSI) values, SINR measurements, etc. More generally, a "feedback opportunity" means the occurrence of an opportunity for one entity to provide feedback to another entity, for use by the other entity in adapting a radio link between the two entities.

An applicable scenario is where rapid periodic fading significantly impacts the performance of LA being performed by a TRP 22 with respect to one or more UEs 12. For example, problematic periodic fading may occur for UEs 12 moving towards or away from the TRP 22 at speeds of 50 km/h or greater. Of course, the critical speeds or speed ranges depend on a variety of factors and the TDD configuration in use.

For example, a TDD configuration that is downlink-heavy may cause poor LA performance for UEs 12 moving above a certain speed, while a TDD configuration that includes a better balance or distribution of uplink subframes may allow for good LA performance for the same speed or higher. A key recognition here is that a given LA time constant may result in LA that is too slow for the periodicity of channel variations being experienced by one or more of the involved UEs 12. Put simply, the LA algorithm of the TRP 22 adjusts after the worst channel conditions and fails to utilize available radio resources efficiently as the channel becomes better, because the convergence time—LA time constant—of the LA algorithm is on par with or longer than the time available until next fading dip.

In TTD systems, i.e., networks that separate uplink and downlink communications using TDD, the uplink and downlink may follow the same channel quality or exhibit the same characteristics. This fact means that the limiting link direction is the one that will gain most, i.e., the link direction that represents the "bottleneck". Hence the problem will be most clearly seen in the direction having the most transmissions or carrying the most data.

In a representative example, a TRP 22 receives signal strength measurement reports from a connected UE 12. The measurement report typically comprises a signal strength value, depending on system configuration, for at least one beam 50, with a typical reporting periodicity of 10-20 milliseconds. Thus, for a UE 12 traveling at 50 km/h, 35 to 70 measurements can be achieved for 10 meters of travel towards or away from the TRP 22.

In a preparative phase, a network node 18 responsible for the TRP 22 performs a number of operations, such as: monitor signal strength characteristics for one or more beams 50; evaluate amplitude and periodicity of signal strength or other link parameters for variations and coherence time; evaluate co-variance of amplitude/periodicity patterns for adjacent beams 50, to exclude non-periodic aspects, such as externally induced blocking, mobility, etc.; and aggregate beam characteristics data for a time duration x. The value "x" is, for example, the fraction of typical beam usage time as a percentage. The network node 18 may also consider additional information, e.g. hour of day, etc.

Consider the case where a UE 12 experiences impairment with respect to being served by the TRP 22 using a particular beam. The network node 18 discerns the impairment from measurement reports from the UE 12 and may evaluate the impairment to determine whether it constitutes periodic fading—i.e., fading characteristic of two-ray ground reflection—or something else, such as one-time or limited intermittent blocking. In this sense, the foregoing "x" can be understood how much of the UE's usage time of the beam is impaired. At least for purposes of determining whether the UE 12 is experiencing impairment relevant to evaluating a TDD configuration change for the TRP 22, impairment having corresponding values of "x" below some threshold, e.g., 5%, may be ignored.

The network node 18 calculates a per-beam fading periodicity pattern (FPP) measure. The FPP pattern may be represented by a collection of calculated or estimated values, including a FadingPeriodicityLength [ms], a FadingPeriodicityVariance [ms], a FadingPeriodicityAmplitude [dB], and a FadingPeriodicityAmplitudeVariance [dB]. Of course, these variables/terms represent a non-limiting example of the data that can be used to express or characterize the fading.

The network node 18 also may compute per-beam average UE utilization times, and may derive various other items of information. Regarding an example case of per-beam average UE utilization times, the network node 18 may ignore, at least for purposes of evaluating TDD configuration changes, impairments associated with a specific beam that is rarely used. Further, the network node 18 may determine LA time constants corresponding to each TDD configuration in a defined set of TDD configurations, determine the number of UEs 12 that are involved, e.g., overall number of users 60 and, possibly, the number of affected users 62 (also referred to as impaired users 62) and the number of unaffected users 64 (also referred to as unimpaired users 64). Other information that may be considered by the network node 18 is the uplink/downlink buffer statuses for the currently served UEs 12, the uplink/downlink throughput for the currently served UEs 12, where the throughput may be aggregated, the preferred TDD configuration in view of the services being used, the uplink/downlink traffic patterns, etc., and the preferred LA time constant, T_mn_preferred. Here, the term "preferred" refers to, for example, default settings or policy-based settings applicable to the TRP 22.

Over time, beams 50 that are sensitive to rapid periodic fading can be identified by the network node 18, and the network node can control the TDD configuration used by the TRP 22 to ameliorate the fading impact for such beams 50. Consider an example approach taken by the network node 18 in one or more embodiments for a given beam 50, referred to as "Beam A".

For the downlink direction, the network node 18 compares the FPP for beam A with time-constants T_mn for the available UL/DL TDD patterns—i.e., the available TDD configurations. The comparison indicates whether fading variations are faster than the LA feedback loop associated with the TDD configuration currently in use at the TRP 22. In other words, the comparison indicates whether there is risk that LA at the TRP 22 is not properly functional.

The network node 18 may also determine, when users 60 suffer from periodic fading, whether the main occurrence of incorrect blocks coincides with the fading dips, i.e., when lower beam power is observed. This relationship can be deduced by determining that the error pattern correlates with the FPP observed for Beam A, which also means that MCS is lower than expected for the prevailing signal levels. These operations may be expressed as:

IF (DL MCS is lower than expected) AND (DL BLER is "bursty) && (FPP_beam_A<(currentT_mn+threshold)), where DL denotes the downlink, "bursty" refers to larger variations over a given time period compared to steady-state or more stationary BLER behavior, and the threshold is, for example, a genereicHysteresis level or a perBeamOffset value.

The network node 18 selects a new TDD pattern that provides the lowest T_mn, i.e., the shortest LA feedback cycle, or at least selects the TDD configuration that provides an acceptable LA time constant in view of the fading periodicity, while preferably still allowing an uplink/downlink allocation ratio and pattern that is favorable for the prevailing traffic conditions.

The network node 18 may perform such operations with respect to the uplink direction, for example, by relying on downlink measurements, because power measurements in the uplink normally are affected by power control, making them harder to use in a time-series comparison. In an example, the network node 18 evaluates downlink SINR. Then, after some time period T_TDD_adjustment_recovery:

IF (UL/DL MCS is lower than expected) AND (UL/DL BLER is "bursty") && (FPP_beam_A<(currentT_mn+threshold)), the network node 18 selects a new TDD pattern that provides the highest UL/DL throughput for the constraint that the new LA time constant, T_mn, is <(FPP_beam_A+threshold). The network node 18 may repeat such operations with a periodicity given as TDD Adaptation Periodicity until, the new TDD pattern is the preferred TDD pattern, TDD preferred, or the new TDD pattern is enough similar to the TDD preferred.

In more detail, a network operator of the network 10 may designate or devise preferred TDD-configurations to be used in terms of an uplink/downlink throughput perspective. In scenarios where most of the user traffic is downlink streaming, the preferred TDD configuration provides many more downlink transmission opportunities than uplink transmission opportunities, e.g., a 24:1 ratio of DL to UL opportunities. However, the network 10, e.g., using one or more network nodes 18, may have an opportunity during an evaluation period to evaluate TDD-configuration adaptations that are optimal in terms of protecting UEs 12 from periodic fading but perhaps not optimal with respect to the DL/UL traffic ratios prevailing at any given time. However, an adapted TDD configuration may be "good enough" in comparison to the TDD configuration that is optimal for the DL/UL traffic ratio in the absence of periodic-fading impairments. Indeed, the loss in throughput for UEs not affected by periodic fading may be at least partially offset by the gains in throughput achieved for affected UEs via use of adapted TDD configuration.

In a basic approach, it is assumed that one link direction is dominant with respect to amount of data to be transmitted, e.g., that one user 60 typically uses heavy downlink traffic or heavy uplink traffic. In that context, the associated LA control signaling, the LA feedback loop for that direction, will suffer from a "longer" delay. While there may be many versions of a fifty-fifty allocation of uplink and downlink resources, the distribution of uplink and downlink resources also affects LA feedback delays. The most beneficial from a LA-feedback perspective would be "DUDUDUDUDU" whereas a similar overall 50/50 split of DDDDDUUUUU would render longer feedback delay but less TDD switching.

As noted, the network node 18 may specifically evaluate which link direction contains most payload traffic, and correspondingly which reciprocal direction will carry the associated LA feedback. Selection of the appropriated TDD configuration to use for the involved TRP 22 would then be based on determining which available TDD configuration is best or at least usable for the prevailing traffic conditions, while simultaneously offering a LA time constant, T_mn, that is fast enough to handle the detected FPP.

In at least one embodiment, the network node 18 selects a TDD configuration that has a sufficiently short LA time constant, subject to the constraint that the adaptation is worthwhile. For example, the network node 18 may determine an expected performance for the new TDD configuration by estimating throughput improvements that would be achieved for the impaired users 62 given the adoption of the new TDD configuration. Against those expected improvements, the network node 18 may weigh expected degradations for the unimpaired users 64, arising from the change in TDD configuration.

As a specific example, in a set of users 60 and where the FPP is less than the current LA time constant plus some margin to allow for tolerance, a user 60 is considered an impaired user 62 if the user's DL MCS is lower than expected and the user's DL BLER is bursty. For each impaired user 62, the network node 18 calculates the expected change in throughput that will result from changing the TRP 22 from its current TDD configuration to a new TDD configuration. This variable is referred to as "DeltaThpPerImpairedUser" and it may be calculated by comparing the current, impaired bitrate of the user 62 with the expected bitrate resulting from the changed TDD configuration. The expected bitrate calculations rely on, for example, the current signal strength and SINR, as reported or detected for the impaired user 62, but also assumes proper LA performance with respect to the impaired user 62. With the foregoing approach, the TotalThpImprovementForImpairedUsers is given as the Sum_over_impaired_users(DeltaThpPerImpairedUser).

Unimpaired users 64 may be defined as those users 60 who have a good MCS and a good BLER and for whom any observed FPP is greater than the current T_mn plus some threshold. A "good" MCS corresponds to the case where the user's current MCS is the best possible MCS given current SINR and current RSRP plus a threshold. Similarly, a "good" BLER is a current BLER that is within a threshold of the BLER target. For such users 64, the network node 18 computes a DeltaThpPerNonImpairedUser. The calculation is the difference between the current bit rate of the user 64 and the expected bitrate for the user 64, assuming implementation of the new TDD configuration at the TRP 22. Then, the TotalThpDegradationForNonimpairedUsers is the Sum_over_nonimpaired_users(DeltaThpPerNonImpairedUser).

The network node 18 can then decide whether to proceed with a change from the current TDD configuration to a new TDD configuration contemplated for selection by determining whether the TotalThpImprovementForImpairedUsers)> (TotalThpDegradationForNonimpairedUsers+Offset), where the "Offset" may be zero or, to allow for some margin, a non-zero value.

In the same or other embodiments, the network node 18 is configured to calculate how many users 60 have their uplink or downlink transmissions impaired by periodic fading. This calculation may be implemented, for example, by calculating the fraction of downlink users with FPP< (currentT_mn+threshold) during a last time period T, and calculating the fraction of uplink users with FPP<(currentT_mn+threshold) during the last time period T. Users 60 may be classified as uplink users or downlink users in dependence on whether the uplink or downlink is "dominant" with respect to exchanging user traffic. A user for which a majority or some defined threshold percentage of user traffic flows in the downlink direction would be classified as a downlink user. The same logic applies for uplink users. Similarly, the UL/DL user distinctions may be made in dependence on the communication services in use. Users engaged in streaming media sessions, e.g., watching a movie or listening to a podcast, may be deemed downlink users, while a user live-streaming local video to a social media network may be deemed an uplink user. Of course, there also may be "balanced" users, having a balanced ratio of UL and DL traffic.

Regardless of the classification mechanism(s) used, if fraction_DL_users>fraction_UL_users, then the network node 18 optimizes the TDD configuration of the TRP 22 for the best uplink feedback channel performance, to thereby improve the performance of downlink LA. Conversely, if fraction_DL_users<fraction_UL_users, the network node 18 optimizes the TDD configuration of the TRP 22 for the best DL feedback channel performance, to thereby improve the performance of uplink LA. Such optimizations, in addition to considering the ratio of uplink-to-downlink allocations defined by the respective TDD configurations, may consider the distribution patterns of uplink and downlink allocations.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation by a network node of a wireless communication network, the method comprising:
   detecting a fading periodicity of periodic fading on a radio link handled by a Transmission Reception Point (TRP) of the wireless communication network, the radio link used for serving one or more user equipments (UEs);
   comparing the detected fading periodicity to a Link Adaptation (LA) time constant for the TRP performing link adaptations with respect to the radio link, the LA time constant being a function of a Time Division Duplex (TDD) configuration of the TRP; and
   adapting the TDD configuration of the TRP so as to reduce the LA time constant, in response to the detected fading periodicity being shorter than the LA time constant and a monitored performance level of the radio link being below a performance level expected for prevailing radio-signal reception conditions of the radio link.

2. The method of claim 1, further comprising determining the prevailing radio-signal reception conditions based on evaluating the one or more radio-signal reception parameters for the radio link, as indicated in downlink signal-strength or signal-quality reports received from the one or more UEs, as reported over one or more periods of time.

3. The method of claim 1,
   wherein the monitored performance level of the radio link is at least one of: monitored transmit-modulation orders, monitored transmit-coding rates, or monitored communication error rates; and
   wherein the performance level expected for the prevailing radio-signal reception conditions of the radio link is one or more corresponding ones of: expected transmit-modulation orders, expected transmit-coding rates, or expected communication error rates.

4. The method of claim 1, wherein the TRP operates with beamforming that defines multiple beams, and wherein detecting the fading periodicity of periodic fading on the radio link comprises detecting the fading periodicity for individual ones of one or more of the multiple beams.

5. The method of claim 1, wherein adapting the TDD configuration comprises changing to a TDD configuration associated with a LA time constant shorter than the detected fading periodicity.

6. The method of claim 1, wherein the TDD configuration defines a pattern of uplink transmission intervals and downlink transmission intervals within a defined window, and wherein adapting the TDD configuration comprises changing the pattern to increase the number of uplink transmission intervals, or changing the distribution of uplink transmission intervals within the defined window to reduce a delay between consecutive uplink transmission intervals.

7. A network node configured for operation as part of a wireless communication network, the network node comprising:
   communication interface circuitry; and
   processing circuitry operative to send and receive signals via the communication interface circuitry and configured to:
      detect a fading periodicity of periodic fading on a radio link handled by a Transmission Reception Point (TRP) of the wireless communication network, the radio link used for serving one or more user equipments (UEs);
      compare the detected fading periodicity to a Link Adaptation (LA) time constant for the TRP performing link adaptations with respect to the radio link, the LA time constant being a function of a Time Division Duplex (TDD) configuration of the TRP; and adapt the TDD configuration of the TRP so as to reduce the LA time constant, in response to the detected fading periodicity being shorter than the LA time constant and a monitored performance level of the radio link being below a performance level expected for prevailing radio-signal reception conditions of the radio link.

8. The network node of claim 7, wherein the processing circuitry is configured to determine the prevailing radio-signal reception conditions based on downlink signal-strength or signal-quality reports received from the one or more UEs, as reported over one or more periods of time.

9. The network node of claim 7,
wherein the monitored performance level of the radio link is at least one of: monitored transmit-modulation orders, monitored transmit-coding rates, or monitored communication error rates; and
wherein the performance level expected for the prevailing radio-signal reception conditions of the radio link is one or more corresponding ones of: expected transmit-modulation orders, expected transmit-coding rates, or expected communication error rates.

10. The network node of claim 7, wherein the TRP operates with beamforming that defines multiple directional beams, and wherein the processing circuitry is configured to detect the fading periodicity for individual ones of the multiple beams.

11. The network node of claim 7, wherein the processing circuitry is configured to adapt the TDD configuration by changing to a TDD configuration associated with a LA time constant shorter than the detected fading periodicity.

12. The network node of claim 7, wherein the TDD configuration defines a pattern of uplink transmission intervals and downlink transmission intervals within a defined window, and wherein the processing circuitry is configured to adapt the TDD configuration of the TRP by changing the distribution of uplink transmission intervals within the defined window to reduce a delay between consecutive uplink transmission intervals.

13. The network node of claim 7 wherein the network node comprises one of:
the TRP; or
a node that is physically separate from the TRP and communicatively coupled to the TRP.

14. A computer-readable medium storing one or more computer programs comprising program instructions that, when executed by processing circuitry of a network node configured for operation in a wireless communication network, configures the network node to:
detect a fading periodicity of periodic fading on a radio link handled by a Transmission Reception Point (TRP) of the wireless communication network, the radio link used for serving one or more user equipments (UEs);
comparing the detected fading periodicity to than a Link Adaptation (LA) time constant for the TRP performing link adaptations with respect to the radio link, the LA time constant being a function of a Time Division Duplex (TDD) configuration of the TRP; and
adapt the TDD configuration of the TRP so as to reduce the LA time constant, in response to the detected fading periodicity being shorter than the LA time constant and a monitored performance level of the radio link being below a performance level expected for prevailing radio-signal reception conditions of the radio link the trigger condition comprising at least detecting the existence of the impairment condition.

* * * * *